Dec. 5, 1933.   H. A. MUNGER   1,938,347
BEAN HARVESTER
Filed Nov. 5, 1932   10 Sheets-Sheet 10
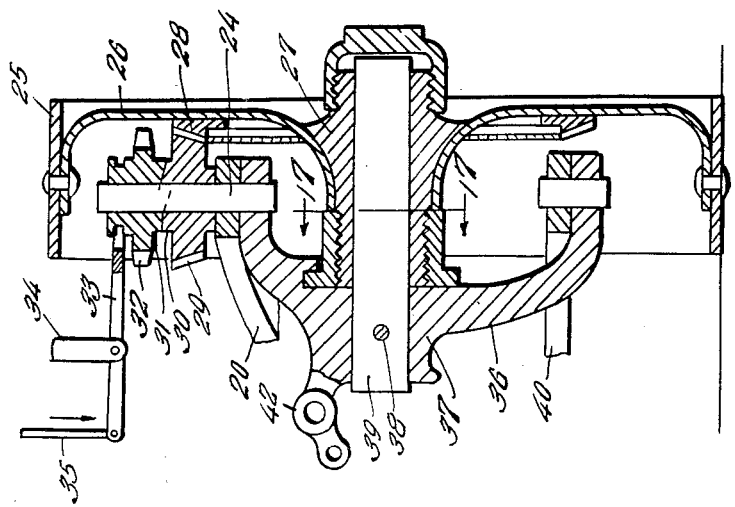
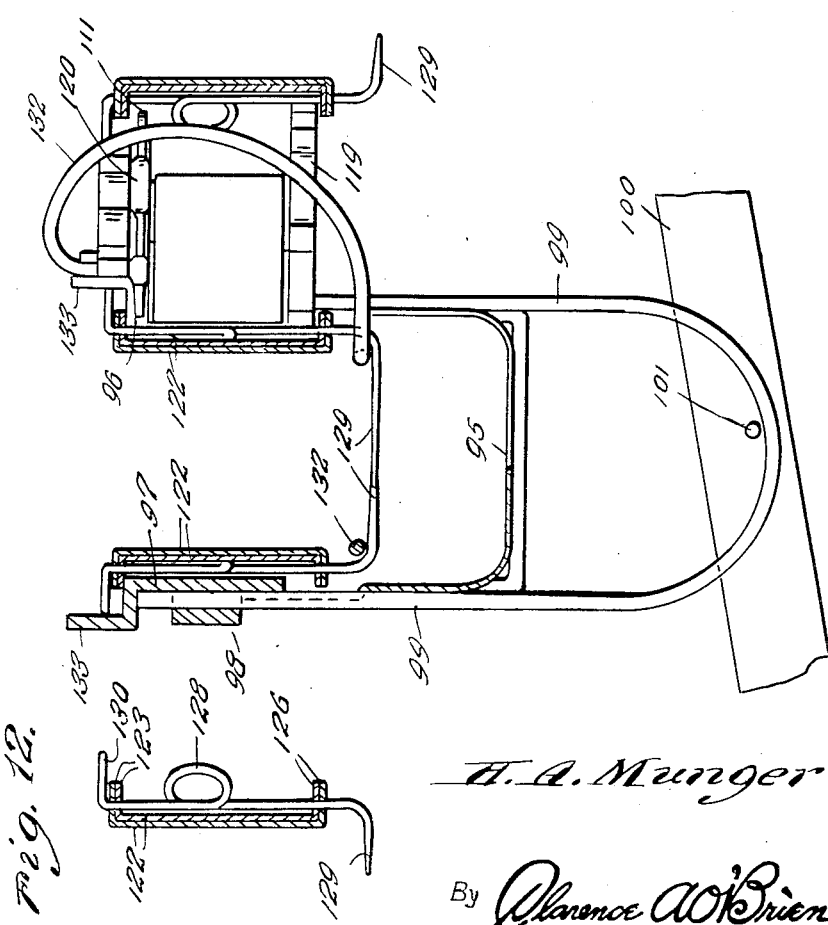
Inventor
H. A. Munger
By Clarence A. O'Brien
Attorney Patented Dec. 5, 1933

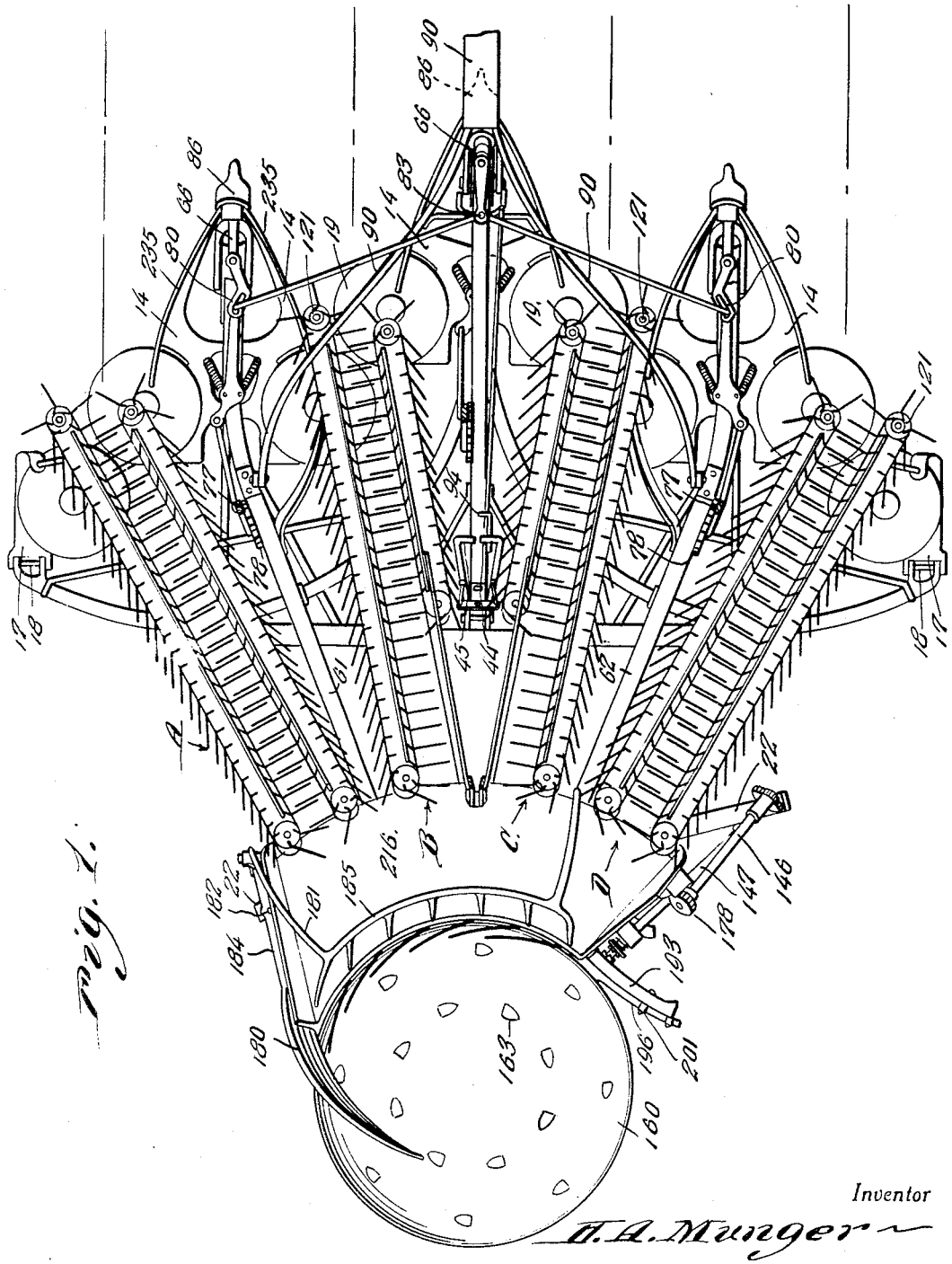

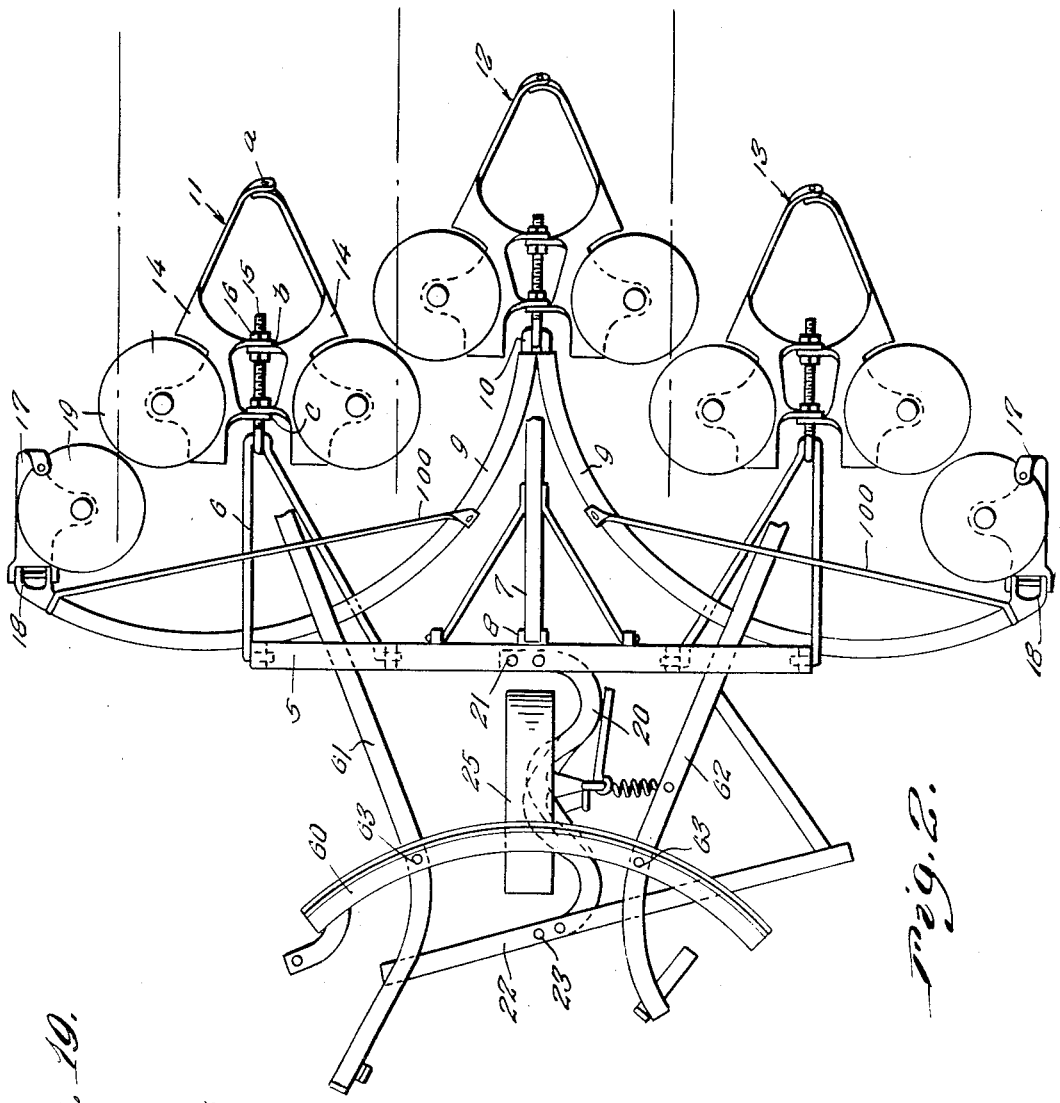

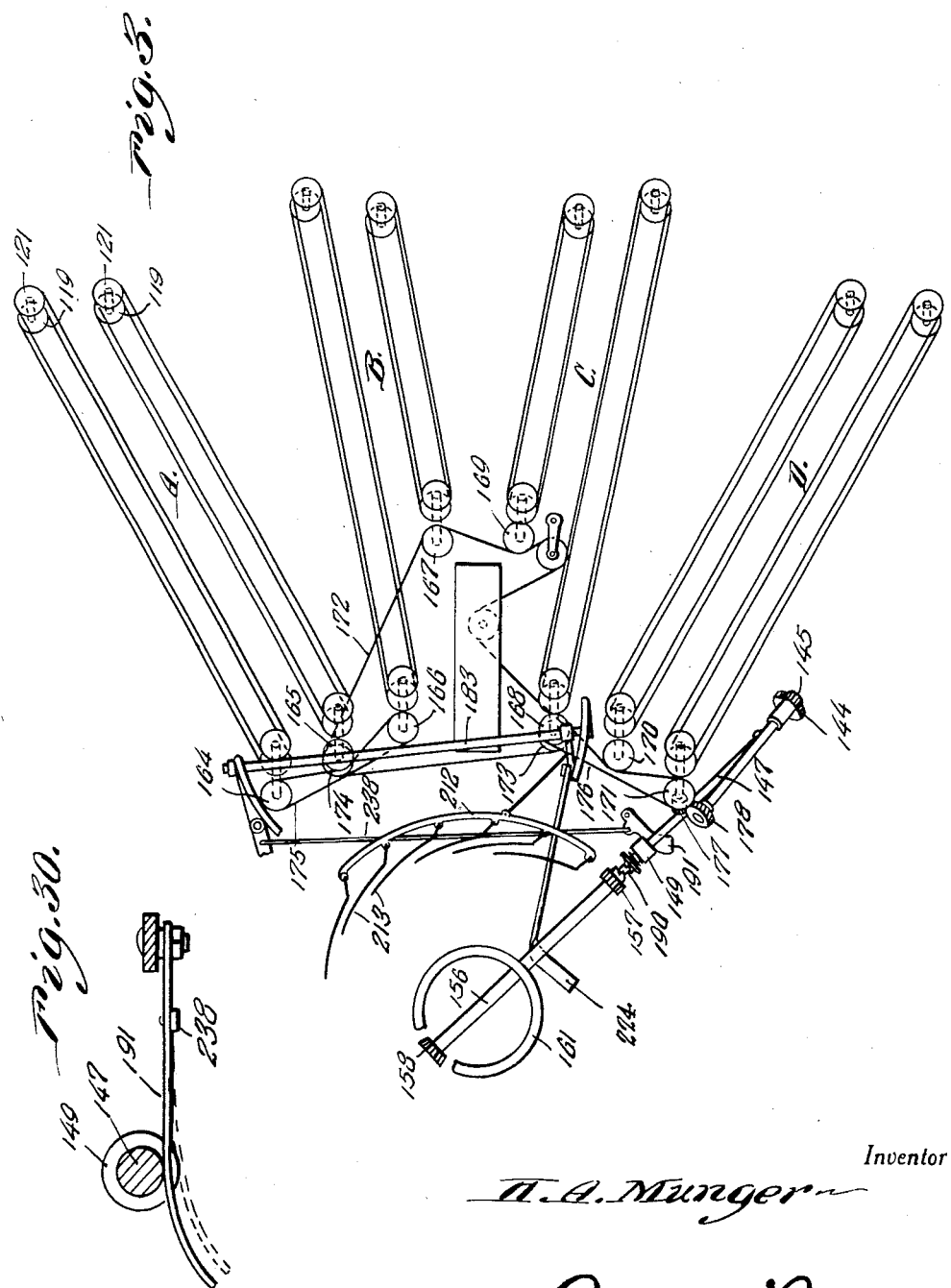

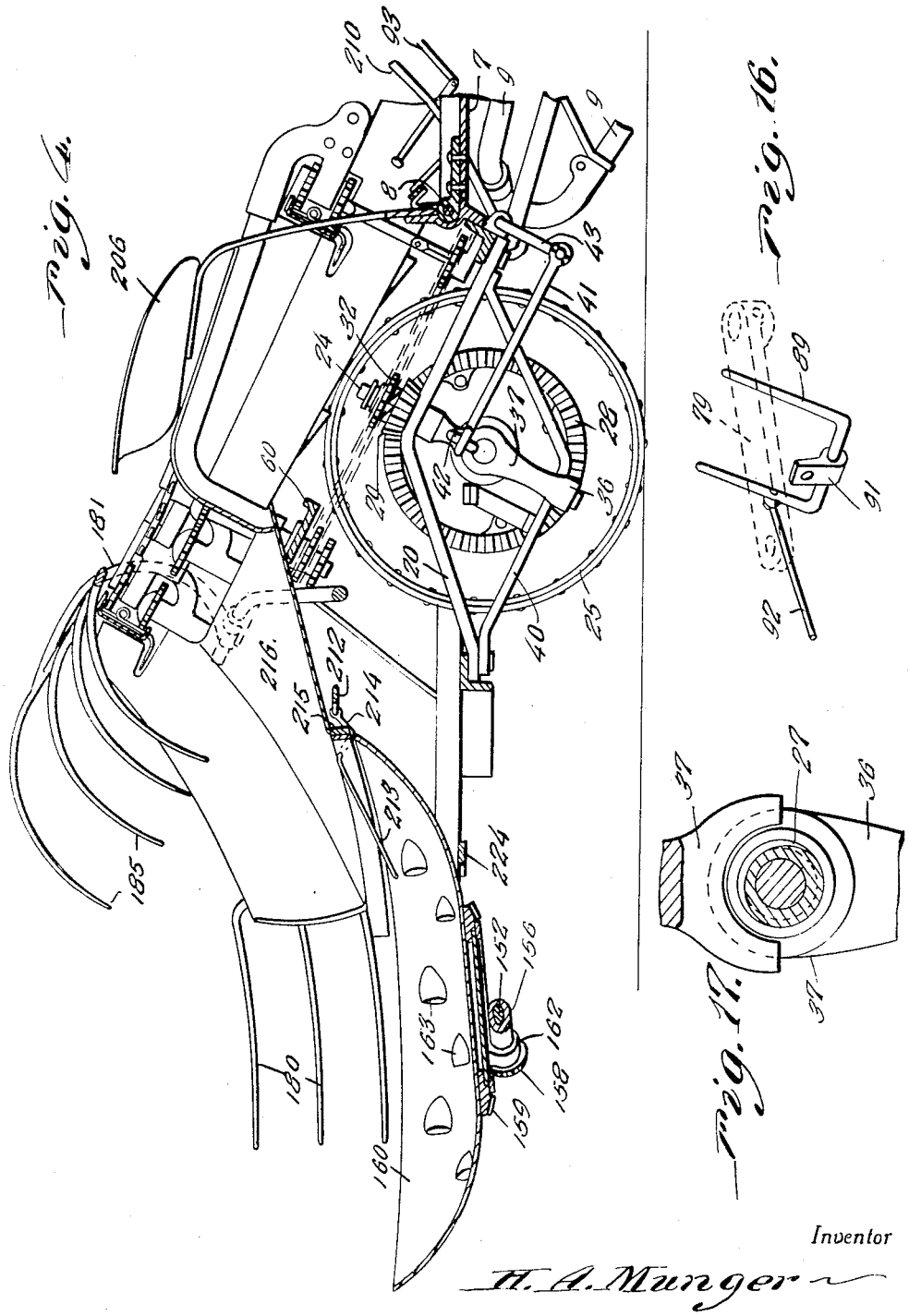

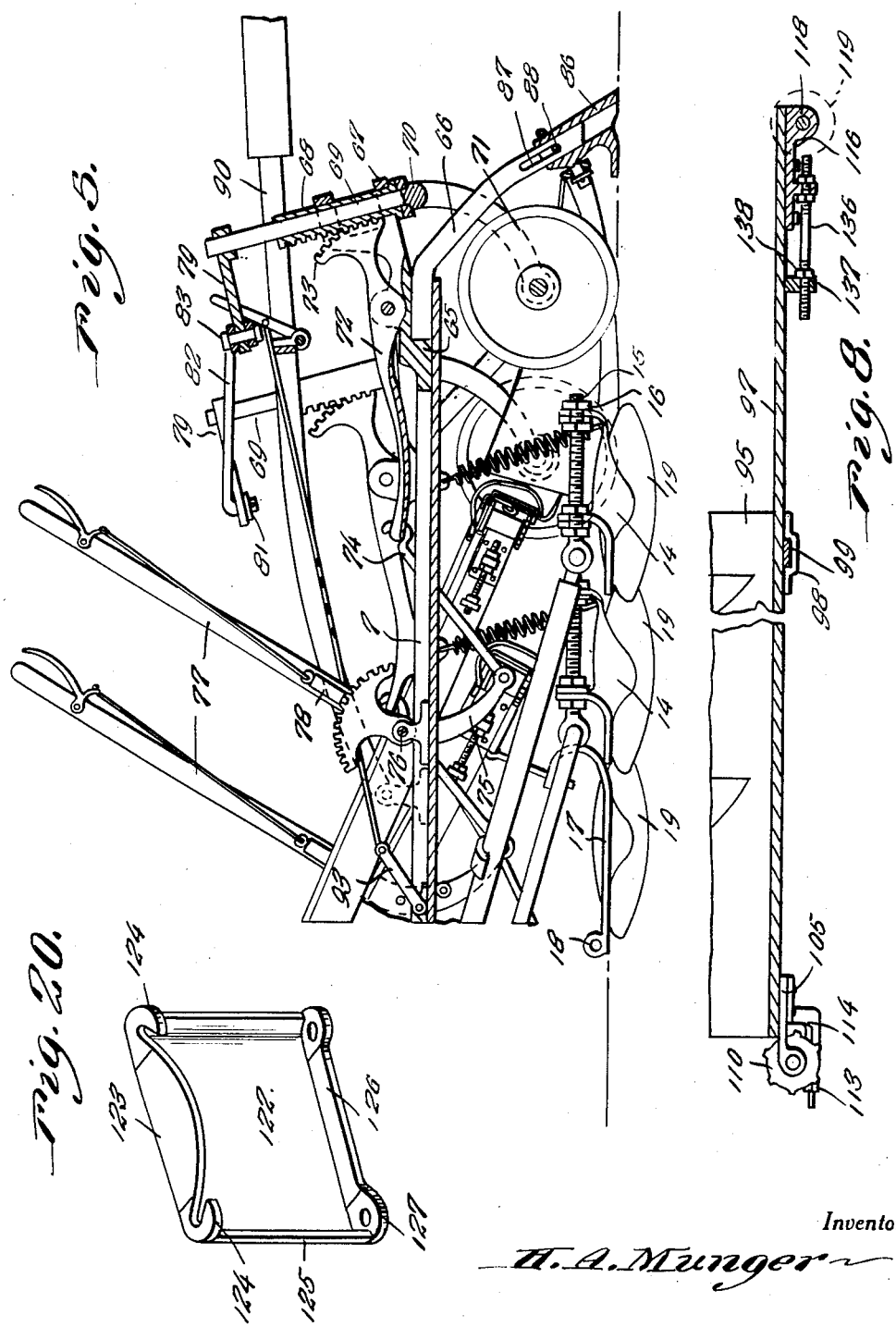

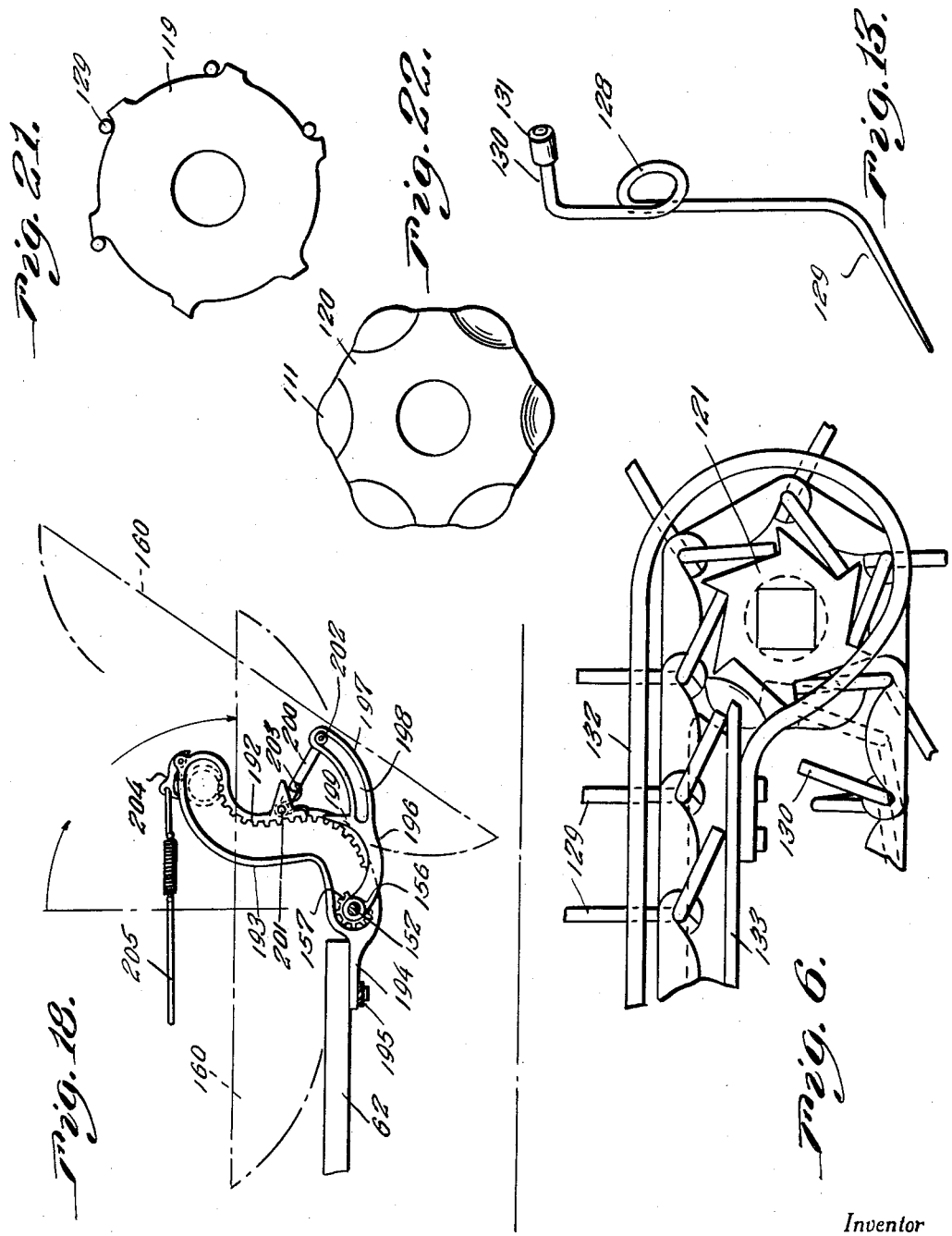

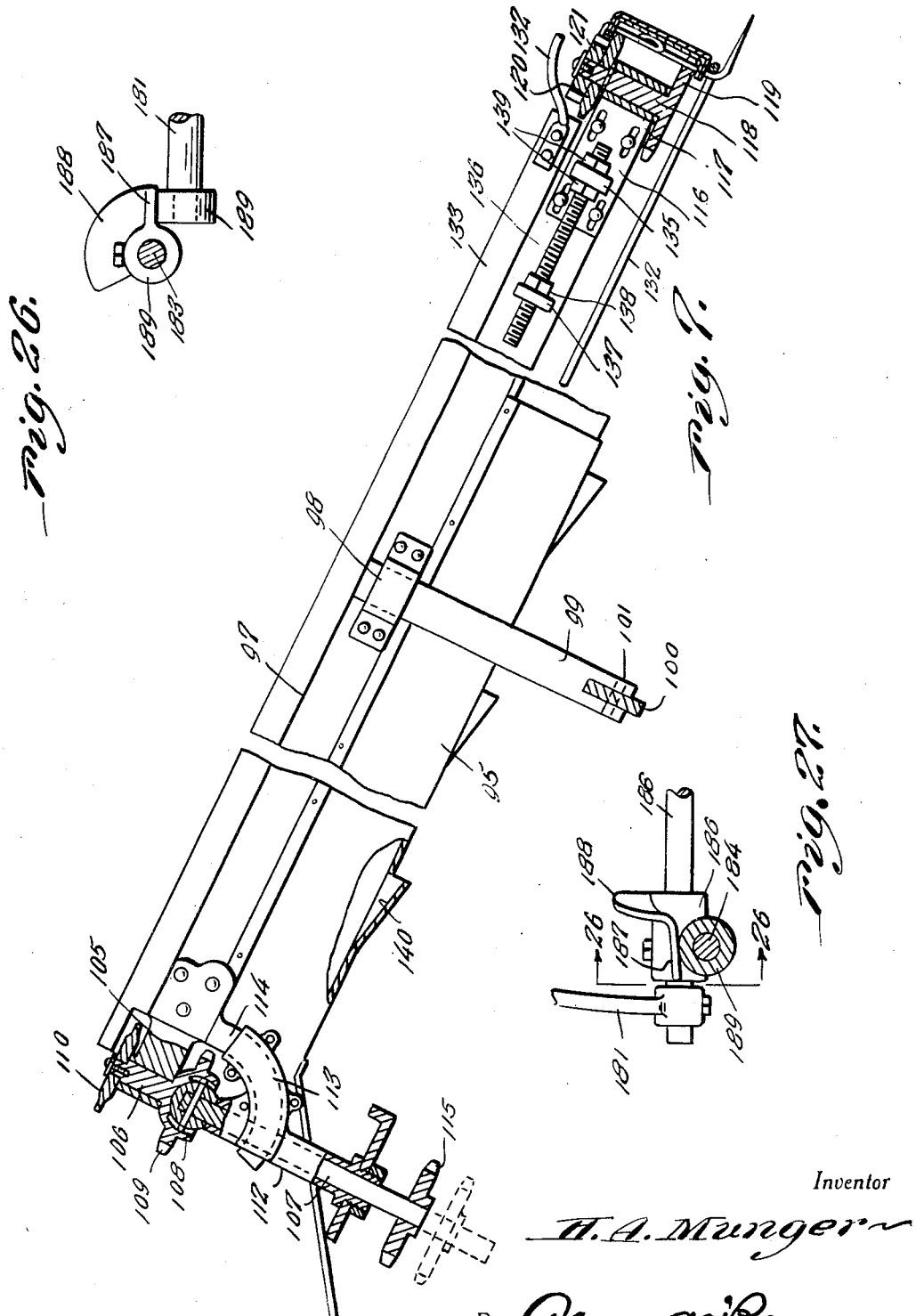

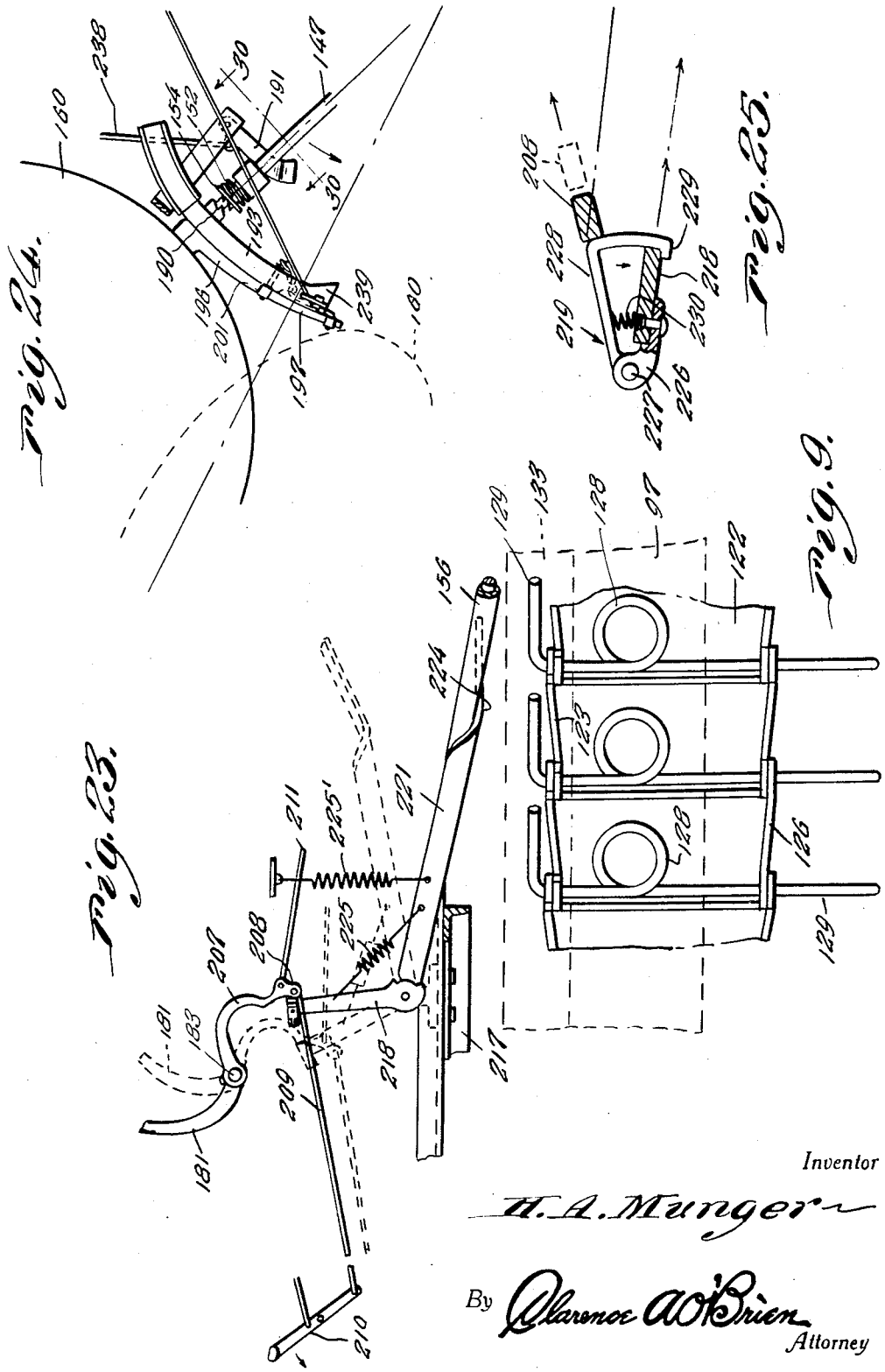

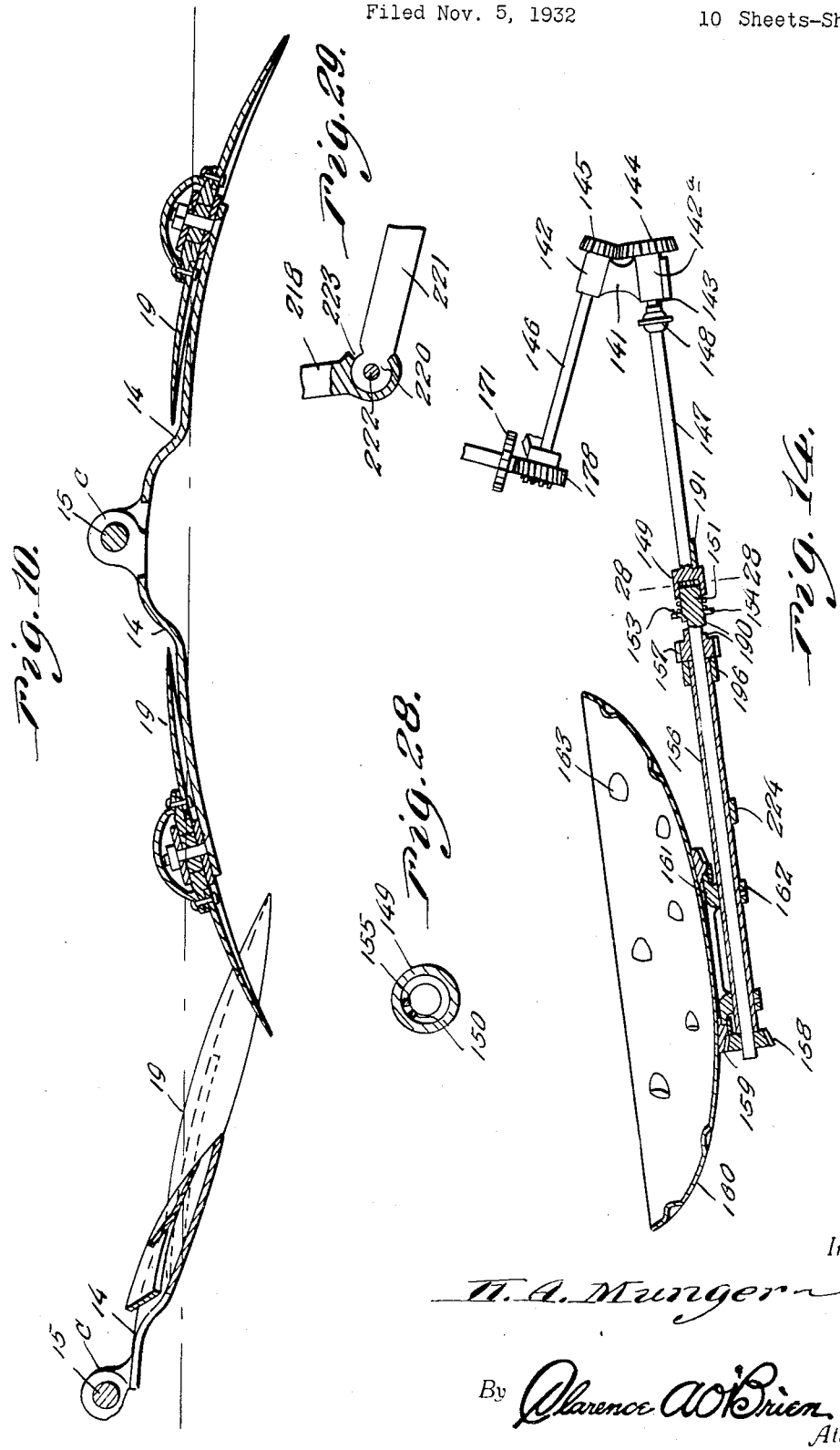

1,938,347

UNITED STATES PATENT OFFICE 1,938,347

BEAN HARVESTER

Henry A. Munger, Freeland, Mich.

Application November 5, 1932. Serial No. 641,430

21 Claims. (Cl. 55—62)

This invention relates to bean harvesters and more particularly to the subject matter set forth in my previous application, Serial No. 388,989.

The principal object of the present invention is to provide a bean harvester which in operation will effectively sever the bean vines at their roots, so that they can be easily displaced to a position on the ground for ready collection.

Another important object of the invention is to provide a bean harvester wherein the bean vines are cut and rolled into substantially a ball which is deposited upon the ground for collection.

Still another important object of the invention is to provide a bean harvester wherein a pair of cutting disks are employed and operated in such a manner that one disk is mounted in advance and stepped inwardly with respect to the trailing disk and adapted to make the major cut through the roots of the growing vines, while the said trailing disk simply cuts small roots not reached on the opposite side of the vine from the lead disk.

Still another important object of the invention is to provide a bean harvester employing a conveyor wherein tines are employed which serve to grip the vines in a clamped manner while they are being elevated to a bundling mechanism and at the same time stripping the severed bean vines from the uncut weeds by the gripping and elevating action of the conveyor tines.

These and various other important objects and advantages of the invention will become apparent to the reader of the following specification.

In the drawings:—

Figure 1 represents a top plan view diagrammatically showing the entire harvester.

Fig. 2 represents a top plan view showing only the frame work, the disks and shoes.

Fig. 3 represents a top plan view diagrammatically disclosing only the drive means for the conveyor as well as for the ball forming pan and retractile fingers.

Fig. 4 represents a fragmentary longitudinal sectional view through the rear half portion of the machine.

Fig. 5 represents a fragmentary longitudinal sectional view through the front half portion of the machine.

Fig. 6 represents a fragmentary top plan view of one of the conveyors.

Fig. 7 represents a side elevational view of one of the conveyors with the endless conveyor element removed and being otherwise partly shown in section.

Fig. 8 represents a fragmentary longitudinal sectional view through the conveyor structure without the endless element as shown in Fig. 7.

Fig. 9 represents a fragmentary side elevational view of the conveyor looking at the inner side thereof with the endless unit mounted thereon.

Fig. 10 represents a vertical sectional view through certain of the disks and their shoes.

Fig. 11 represents a front elevational view of one of the conveyors with one side thereof in section.

Fig. 12 represents a cross sectional view through one of the endless elements of the conveyor shown in Fig. 11.

Fig. 13 represents a perspective view of one of the tines of the conveyor.

Fig. 14 represents a sectional diagrammatic view disclosing the ball forming pan and drive means therefor.

Fig. 15 represents a bull or drive wheel in vertical section.

Fig. 16 represents a detailed perspective view of the means for controlling caster wheels.

Fig. 17 represents a vertical sectional view taken substantially on line 17—17 of Fig. 15.

Fig. 18 represents a side elevational view of the gear and distorted rack means for elevating and turning the ball forming pan.

Fig. 19 represents the foot engaging levers for operating the bull wheel.

Fig. 20 represents a perspective view of one of the sections of one of the conveyor units.

Fig. 21 represents a top plan view of one of the lower drive sprockets for the endless conveyor chain.

Fig. 22 represents the upper drive sprocket for the conveyor chain or unit.

Fig. 23 represents a side elevational view of the mechanism for operating the fork, the retractile fingers and pan accompanying means.

Fig. 24 represents a top plan view of the pan elevating and tilting means.

Fig. 25 represents a top plan view partly in section disclosing the latch means for operating the fork (see Fig. 23).

Fig. 26 is a sectional view taken substantially on line 26—26 of Fig. 27.

Fig. 27 represents a side elevational view of the retaining means shown in Fig. 26.

Fig. 28 represents a sectional view taken substantially on line 28—28 of Fig. 14.

Fig. 29 represents a fragmentary side elevational view partly in section showing the joint disclosed in Fig. 23.

Fig. 30 represents a sectional view taken substantially on line 30—30 of Fig. 24.

Referring to the drawings wherein like numerals designate like parts, it can be seen that Fig. 2 discloses the frame work, the disks and shoes and in this view, numeral 5 generally refers to the cross frame. Substantially V-shaped members 6 are located at the ends of the bar 5, extend forwardly and have their ends swingably connected to the frame, while at the intermediate portion of the frame bar 5 is located the forwardly projecting bar 7 swingably connected as at 8 to the bar 5. Numerals 9—9 represent arcuate-shaped bars connected together as at 10. Numerals 11, 12 and 13 generally refer to shoe assemblies each provided with a pair of wings 14—14 swingably connected together at the points $a$, $b$ and $c$. At the points $b$ and $c$, a threaded eye member 15 extends therethrough and is suitably secured to the wings 14—14 by nuts 16. The eye ends of the threaded members 15 of the two outside shoes 11 and 13 receive the bight portions of the frames 6, while the eye end of the bolt 15 of the shoe 12 receives the connecting portion 10 between the arcuate bars 9—9.

At the outer end of each of the arcuate bars 9 is located a single shoe 17 swingably connected as at 18 to the corresponding bar 9.

On each of the wings 14 is located an angularly set disk 19 and such a disk is also located on the single shoes 17 at the outer ends of the bars 9.

At this point, it will be observed that the shoe 12 projects forwardly of the shoes 11 and 13 so that the disks 19 thereon are slightly in advance of the inside disks 19 on the shoes 11—13 and it will furthermore be seen that the shoes 11—13 are in advance of the shoes 17 so that the outside disks 19 of the shoes 11—13 will be in advance of the disks 19 on the shoes 17. The pair of cutting disks of each row involve disks which are in interlapping relation with one another so that while the lead disk of the pair cuts a substantial portion of the bean vine from one side, the complementary disk will complete the operation from the opposite side of the row. It is to be understood that stones or other obstructions in the bean row may pass through freely, and furthermore each individual disk depends entirely upon sub-soil resistance as the cutting means is wholly dependent upon this frictional resistance for rotation. All hindrance or back thrust is eliminated by having the disks with their convex sides upward, also by providing a knife like shoe which precedes the free side of the disk.

Numeral 20 represents a substantially W-shaped bar having one end secured to the intermediate portion of the bar 5 as at 21 while its opposite end is secured to the obliquely disposed bar 22 as at 23. The intermediate portion of this bar 20 is apertured to receive the shank 24 which forms part of the bull wheel 25. This bull wheel 25 is provided with a disk connection 26 to the hub 27 and the inside of this disk 26 carries the bevel ring gear 28 which meshes with the bevel pinion 29. This pinion 29 rides on the shaft 24 and has a clutch ratchet 30 connectible with the clutch ratchet 31 on the sprocket wheel 32. The sprocket wheel 32 is also rotatable on the shaft 24 and a yoke 33 supported by the bracket 34 can be actuated by the rod 35 to manipulate the gear into engaged or disengaged relation with respect to the gear 29. Numeral 36 represents an arm extending from the body 37 which is secured by a pin 38 to the spindle 39 and to this connects the brace rod 40, complementary to the brace bar 20.

Numeral 41 represents a connection rod having an eye engaged with the eyelet 42 on the body 37 and this rod 41 connects to the crank 43 which is actuated by the foot pedal 44, (see Fig. 19). This foot pedal 44 is located adjacent to the foot pedal 45 which is of identical construction, excepting that the pedal 44 has a pintle 46 to which the crank arm 43 aforementioned is secured.

Numeral 47 represents a bracket secured to the frame bar 5 shown in Fig. 2 and swingable on this is the member 48 from the ends of which extend the connecting rods 49—49 to the clamps 50—50 on the pedals 45—44. Obviously, by pushing downwardly on the pedal 44, the bull wheel can be operated in one direction and by pressing downwardly on the pedal 45, the pedal 44 will be swung in the opposite direction for operating the bull wheel to steering in the opposite direction.

As is clearly shown in Fig. 2, an arcuate angle iron 60 is disposed across the forwardly extending and diverged bars 61—62 and the same is supported by brackets thereon, (see Fig. 4). The rear ends of these bars 61—62 are diverged as substantially shown in Fig. 2. The forward ends of the bars 61—62 are provided with extensions parallel to the bar 7 and as is clearly shown in Fig. 5, the forward end of each bar 7, as well as the forward end of each of the bars 61 and 62 is provided with a casting 65. Each of these castings 65 is provided with a socket for receiving the upper end of the corresponding shoe shank 66 and also with an extension terminating in a bearing 67 through which the rack barrel 68 is slidable. This barrel 68 is free on the fork shank 69, the fork 70 of which has the caster 71 mounted therein. A lever 72 is rockably mounted on each of the bars 61, 7 and 62 and is equipped at one end with a quadrant gear 73 meshing with the rack barrel 68.

The rear end of each rocker 72 is apertured to receive the hook end of the connecting rod 74 which is pivotally connected at its opposite end to the arm 75 which extends from the shank 76 actuated by the hand lever 77. There is one of these hand lever controls on each of the bars 61, 7 and 62 to control the corresponding caster wheel 71 and each is provided with a rack and detent 78.

The upper end of each of the caster shanks 69 is provided with a laterally disposed lever 79, the levers on the shanks of the end casters being slotted as at 80 in Fig. 1 to receive loosely the securing means 81 at the ends of the connecting rods 82. The remaining ends of the connecting rods 82 are connected swingably as at 83 to the lever on the shank 69 of the intermediate caster wheel 71.

On the shoe shanks 66 are the shoes 86. Each shoe 86 is hollow to receive the lower portion of the corresponding shank 66, which is slotted as at 87 to receive the cross pin 88 in the shoe. Thus the shoe is slidable on the corresponding shank.

The caster wheels 71 are controlled by a U-shaped fork 89 swingably mounted on the tongue 90 by having its bight portion passing through the bearing 91. The legs of this yoke 89 pass upwardly on opposite sides of the lever 79 of the intermediate caster wheel 71 and extending from one leg of this yoke is a connecting rod 92 connected to the lever 93 on the bar 7. A lever (see Fig. 1) denoted by numeral 94 is employed for actuating this rod. By reciprocating the rod, the yoke can be actuated to straighten the lever and consequently the entire groups of caster wheels 71.

Referring to Fig. 1, it can be seen that there are four conveyor assemblies generally referred to by A, B, C and D.

As is apparent in Fig. 11, each conveyor includes a trough 95 and a pair of overlying side walls 96—97.

Each side wall 96—97 is provided with a retaining strap 98 for receiving the upper end of the corresponding leg portion of the U-shaped support 99 which has its bight portion slotted to receive the corresponding brace member 100. These brace members 100 bridge remote portions of the arcuate bars 9 in the manner substantially shown in Fig. 2. A pin or similar stop means 101 is provided on the brace bar 100 to prevent displacement of the U-shaped support 99 as is clearly shown in Fig. 11. Fig. 11 shows the right portion of the conveyor in end elevation, while the left portion is substantially in section and as is clearly apparent in Fig. 1, one side wall of each conveyor assembly projects forwardly of its complementary side wall.

It will be observed in Fig. 1, that the endless assemblies on the two intermediate conveyors B and C and at the opposite sides of these conveyors are shorter than the remaining endless assemblies because of the acute converging angular disposition of the upper ends of these conveyors to each other.

Each of the end conveyors has a bearing 105 at the upper end of each side wall 96—97 and thru each of these bearings 105 is disposed a stub shaft 106. The portion of the shank 106 below the bearing 105 is connected to the shaft 107 by the universal joint 108, the shell of which forming part of the shaft 106 being provided with a sprocket 109. The upper end of the shank 106 above the bearing 105 is provided with a drive wheel 110 which as shown in Fig. 22 is constructed with spaced protuberances 111 which are formed by some pinching process.

The shaft 107 extends through a barrel 112, which has an arcuate guide 113, thereon for slidably receiving the arcuate guide finger 114 projcting from the bearing body 105. The lower end of each of the shafts 107 is equipped with a sprocket wheel 115.

The lower end of each side wall has a plate 116 slidably secured thereto and each plate 116 is provided with a bearing 117 for receiving the shaft extension 118 of the sprocket wheel 119. The upper end of each shaft 118 carries a drive wheel 120 identical in construction with the drive wheel 110 and above this drive wheel 120 and secured to the shaft 118 is ratchet wheel 121. (See Fig. 6).

Each conveyor assembly is made up of a plurality of units such as is shown in Fig. 20 in complement with a plurality of units such as is shown in Fig. 13. The unit in Fig. 20 consists of a plate 122 provided at its upper edge with a flange 123 tapering toward its ends from its intermediate portion and terminating at its ends in hook members 124—124. The ends of the plate 122 are curved inwardly in the direction of the hook 124 as denoted by numeral 125, while the lower edge of the plate 122 is provided with a flange 126 terminating at each end in an eyelet 127 underlying a corresponding hook 124. The plates 122 are connected in an endless arrangement by the employment of units, one of which is shown in Fig. 13. This unit consists of an elongated element having its intermediate portion coiled to provide a spring 128, the same being of spring material and having its lower end bent laterally and formed to provide a prong 129. The upper end of this element is bent laterally on an oblique plane to the vertical plane of the prong 129 and this is denoted by numeral 130 and if desired, this projection 130 can be equipped with a wear resisting collar or sleeve 131 which can be replaced from time to time as the same wears. The manner in which the plates and prong units are assembled together is clearly shown in Fig. 9. The plates 122 are arranged with their ends overlapping so that the eyes of adjacent plates will be registering. The prong ends of the prong elements are inserted through the registering eyes and subsequently disposed into the hooks and obviously when the plates are pulled apart, the hooks of adjacent plates being disposed in opposite directions will form a lock for the upper portion of the prong elements as shown in Fig. 9, so that there is no likelihood of the element becoming displaced and disrupting the continuity of the endless assembly.

Extending longitudinally of the trough 95 of each conveyor and immediately below each side wall 96—97 is a guide rail 132 under which the prongs 129 of the elements shown in Fig. 13 can ride and be prevented from rising out of a definite path of travel; also the prongs are freed from the bean vines as they collapse and withdraw from under said guide rail.

Upon each side wall 96—97 is an angle iron forming a track 133 against which the laterally disposed upper end portions 130 of the prong elements ride as in the manner substantially shown in Fig. 6. It will be observed in Fig. 6, that the ratchet wheel 121 serves to hold the prong elements in a predetermined position as they are fed around on the plates 122 by the wheels 119 and 120 (see Fig. 7).

As will be apparent in Fig. 6, the flanged portions of the plate 122 are on the inside of the endless assembly so that the wheels 119 and 120 can engage the intermediate portions of the prong elements and thus feed the endless assembly.

By referring to Fig. 1, it can be seen, that on each conveyor, the tines or prongs in moving up the conveyor cooperate as shown to snugly engage the vines and this is accomplished by the tines on the forwardly projecting endless assembly first moving inwardly on the conveyor while a corresponding tine on the other or complementary endless assembly falls in immediately behind the aforesaid tines and in this motion, the tine of the shorter endless assembly sweeps in the vine and clamps the same against the preceding tine of the longer endless assembly just as the roots of the vine are being severed by the underlying disks 19.

Referring to Figs. 7 and 8, it can be seen that the aforementioned plate 116 is slidable and has an apertured lug 135 through which the threaded member 136 extends. The member 136 also extends through a lug 137 on the side wall 97 or on the side wall 96 as the case may be, and as is clearly shown in Fig. 7, a nut 138 on the bolt 136 is engaged against the lug 137 while nuts 139 are engaged against opposite sides of the lug 135. Obviously by loosening these nuts and sliding the plate 116, proper adjustment of the plate and bearing can be secured to properly tighten the corresponding endless assembly.

At this point it will also be observed, that the trough 95 is provided with depressions 140 therein at longitudinally spaced intervals and these depressions are open at their lower ends and have slanting bottoms to define chutes so that when the roots of the vines pass upwardly in the trough, they will drop into these chutes and obviously this drop will knock off the roots of the vines any earth that may be clinging thereto, and this earth being more or less granulated will slide down the chute and out through the open lower end thereof back onto the ground.

As is clearly shown in Fig. 1 (also see Fig. 2), the bar 22 at one end supports the casting 141 which has the bearings 142 and 142a thereon. A stub shaft 143 extending through the bearing 142 is provided at one end with a beveled gear 144 meshing with the beveled pinion 145 on the corresponding end of the shaft 146 which is journalled through the bearing 142.

Numeral 147 represents a shaft which is connected to the stub shaft 143 by the universal joint 148. Slidably keyed to this stub shaft 147 is the barrel 149. 151 represents a sleeve which is free on this shaft and is provided with an abutment 154 on one end and a lug 155 on the other end projecting into said barrel which also is provided with a lug 150 for engagement therewith as shown in Fig. 28. A coiled compressible spring 153 is interposed between the barrel 149 and the abutment 154 on the sleeve 151 as in the manner substantially shown in Fig. 14. This arrangement operates to cushion the shock on the engaged clutch 190, also delays the dumping movement of the pan 160 until the fork 185 has dropped and the bean bunch severed by a further rotation of the pan 160. Numeral 156 represents an elongated barrel through which the shaft 147 extends and this barrel carries a pinion 157. At the opposite end thereof is a beveled gear 158 keyed to the shaft 147 and meshing with the ring gear 159 on the bottom of the circular concave pan 160. Numeral 161 represents an annulas clamped as at 162, to the barrel 156 and this forms a bearing for the gear 159 so that the pan can rotate independently of the said barrel 156.

As will be fully understood from the description hereinafter, the pan 160 in rotating forms a ball of the bean vines collected thereon and to assist in this formation of the vines, and to prevent excessive slipping of the vines on the pan, bosses 163 are formed on the pan by depressing the pan at points from its convex side.

Now referring to Fig. 3, it can be seen that numeral 164 represents a sprocket for driving one endless assembly of the conveyor A while numeral 165 represents a sprocket wheel for driving the endless assembly remaining on the conveyor A.

Numerals 166 and 167 represent the sprocket wheels for driving the conveyor B and sprocket wheels 168 and 169 represent the sprocket wheels for driving the conveyor C. The conveyor D is driven by the sprocket wheels 170 and 171.

It can be seen that the sprocket chain 172 is trained over the sprocket wheels 167, 169, 173 (on the shaft with the wheel 168), 174 (on the shaft with the sprocket wheel 165) and back to the wheel 167. This chain 172 thus directly drives the inside endless assembly of the conveyor A, the two endless assemblies of the conveyors B and C as well as the sprocket wheels 165 and 168. Over the sprocket wheel 165 and the sprocket wheels 166 and 164 is trained the chain 175 which serves to drive the outside endless assemblies of the conveyors A and B. A sprocket chain 176 is trained over the sprocket wheel 168 and also over the sprocket wheels 170 and 171 for driving the endless assemblies of the conveyor D.

On the shaft with the sprocket wheel 171 is a worm gear 177 meshing with the gear 178 on the shaft 146. (See Fig. 14.)

Referring to Fig. 1, it can be seen that numeral 180 represents a sweep having an arm 184 fulcrumed on the bar 22, as at 182. As is clearly shown in Fig. 3, numeral 183 represents a shaft extending transversely on the frame of the machine, and being suitably supported which as shown in Fig. 27 has the arm 181 of a fork 185 secured thereto, so as to swing with the shaft. On this end of the shaft is located the collar 186 which has a radially disposed flange 187 merging with a flange 188 disposed in a spiral direction on the collar 186 to terminate at the adjacent end of the collar. This collar is positively secured to the shaft 183 and the roller 189 on the free end of the sweep arm 184 is adapted to ride against this flange 187 and its spiral extension 188.

As is clearly shown in Fig. 14, numeral 190 represents clutch features on the gear 157 and sleeve 151 while numeral 191 represents a lever swingably mounted to engage the barrel 149 to force the barrel and sleeve toward the gear 157 whereby the drive of the shaft 147 is executed through the gear 157, which rides on the S-shaped racks 192 of the S-shaped guide 193. This guide is supported by an extension 194 secured to the frame bar 62 as at 195. (See Fig. 18.)

Extending laterally from the barrel 156 adjacent the gear 157 is the arm 196, which is provided with an arcuate extension 197 having an arcuate slot 198 therein and a tooth 199 projecting laterally from the arm 196 which engages the roller at 201. A finger 200 swingably connected to the rack as at 201 has a laterally mounted roller 202 ridable in the slot 198 of the arm extension 197. A spring 203 serves to maintain the roller in the position at one end of the slot as shown in Fig. 18.

A pawl 204 is mounted upon the guide 193 at the upper end thereof and operates through an opening in the guide 193 to engage the gear 157 when the same is in elevated position for retaining the same to maintain the pan 160 in the tilted position shown in broken lines in Fig. 18.

Fig. 18 also shows a connecting rod 205 extending from a suitable control adjacent the driver's seat 206 which leads to the pawl 204, whereby the pawl can be operated when desired.

As is clearly shown in Fig. 23, the shaft 183 (also see Fig. 3) has a substantially right angularly shaped member 207 secured thereto at one end while its opposite end is provided with a head 208. One end of a connecting rod 209 connects to the head 208 while its opposite end connects to the lever 210 which is situated adjacent the driver's seat.

A connecting rod or cable as desired, and denoted by numeral 211 in Fig. 23, also leads from the head 208 to a connecting bar 212 to which a plurality of fingers 213 are linked. Each of these fingers is provided with a crank portion 214 disposed through the rim 215 of the apron 216 which extends downwardly from the upper ends of the conveyors to terminate immediately above the edge of the pan 160 when the pan is in horizontal position, the rim 215 being curved to conform with the curvature of the pan.

Supported upon the frame extension at 217 is a swingable lever 218 having a yieldable head construction generally referred to by numeral 219 in Fig. 25. As is clearly shown in Fig. 29, this lever 218 is provided with a recessed lower end for receiving the circular head 220 of the arm 221. The pivot pin 222 extends through the lower end of the lever 218 and also through this head 220, the lower portion of the lever being slotted as at 223 to permit some play of the arm 221 independently of the lever 218. This lever has at its outer end a hand 224 for engagement under the barrel 156 in the manner substantially shown in Figs. 14, 23 and 3.

A spring 225 is interposed between the arm and the lever 218 and a supplemental spring 225 is interposed between a portion of the frame and the arm all in the manner substantially shown in Fig. 23.

The latch 219 consists of a plate 226 having a laterally disposed hinge knuckle for receiving a pin 227 whereby one end of the L-shaped swingable element 228 is connected to the plate 226. The free end of this L-shaped element 228 is provided with a lug 229 for engagement against the outside of the lever 218. A spring 230 is interposed between the lever 218 and the hinged end portion of the L-shaped element 228 for normally maintaining the L-shaped element extended to the position shown clearly in Fig. 25.

Obviously when the latch 219 is moved in the direction of its arrow, that is following the path of the lever 218, the head 208 of the member 207 will ride against the L-shaped element 228 and due to the fact that the paths of swing of the lever 207 and lever 218 are diverged, a certain limit of swing of the lever 218 will result in the disengagement of the head 208 from the L-shaped element 228.

In the operation of this machine, the same is pulled along the ground by the tongue 90 thru the agency of horses, a tractor or other draft means. It is obvious that this is intended for four row use, but of course the machine can be altered to increase the number of rows it can accommodate or lessen the number depending upon the capacity of the machine desired.

It is apparent from Fig. 3, just how the endless assemblies of the four conveyors operate and as before stated, the tines (see Fig. 13 and Fig. 1) are cooperative so that the vines guided in the conveyors by the guide members 235 will be clamped between associated pairs of tines so that they will be held until they are released onto the apron 216. See Figs. 1 and 4.

It will also be observed, that in each conveyor, one endless assembly is longer than the other to project forwardly of the lower end of the other or complementary endless assembly so that the tines fed over this end can get an efficient gripping action against the vines which are fed into the conveyor by the tines of the complementary endless assembly.

As the vines slide down the aprons 216 (the forks 185 being in elevated position) they fall upon the pan 160 which is rotating continuously, this drive being taken from the drive sprocket wheel 171, through the shaft connections shown in Fig. 14. As the pan 160 rotates with the vines piled thereon, the mass of vines in, rotating against the sweep 180 will eventuate into the formation of a ball. When this ball-like mass has reached a predetermined size and should be discharged from the pan 160, the inner end of the sweep arm 184 will have passed off of the flange 187 radiating from the collar 186.

The fork 185 which has heretofore depended upon the disposition of the sweep arm roller 189 beneath the flange 187 (see Fig. 27) for its support will now gravitate to a position over the lower end of the apron 216 and this gravitation of the fork will result in a rotation of the collar 186 which will cause the spirally disposed flange 188 to ride against the roller 189 and afford a cam action which will shift the sweep 180 out of the path of the pan 160.

This actuation of the sweep arm 184 will exert a pull on the rod 238 resulting in the exertion of pressure by the lever 191 against the barrel 149, shifting the barrel, so that the sleeve 151 is engaged against the gear 157, thus connecting the shaft 147 and gear 157 so that the gear will rotate. The gear 157 in rotating will ride up the S-shaped rack 192 and in riding up this rack, the barrel 156 will be rotated in accordance with the motion of the arm 196 which is guided by the slotted extension 197 and the roller 202.

This operation of the gear 157 results in the elevation of the pan. Preliminary to the elevation, the pan is moved slightly in a lateral direction, following the course of the S-shaped rack, so as to remove the pan from beneath the apron and completely out of the way of the sweep 180. The gear 157 then rides up the rack and swings laterally again engaging the tooth 199 with the roller at 201 to afford what may be regarded as a "throw" to the action of the pan, so that there will be no likelihood of any portion of the ball remaining in the pan. If desired, the pawl 204 can be operated to engage the gear and retain the pan in this dumped position and furthermore the fork 185 can be elevated so that the vines can be dumped immediately upon the ground instead of formed into balls by the pan 160. These "balls" correspond to the usual hand formed shocks and when the pan 160 is not in use and the vines are dispensed directly onto the ground, a continuous pile is formed which is ordinarily referred to as a "windrow".

This windrow takes in four rows of growing vines and this practice is pursued when the vines are green and require drying.

When the pawl 204 is not employed, the abutment 154 on the sleeve 151 will ride against the cam-like boss 239 whereby the clutch is disengaged. When this occurs, the pan will be free to return to its normal horizontal position. However, it will also be observed, that when the shaft 183 is rotated carrying with it the fork arm 181, the rod 211 is pulled for operating the fingers 213 for catching any dangling parts of the vines so that the rims 215 of the apron will be clear when the pan returns to its receiving position.

Normally, when the shaft 183 rotates, the fork drops as the pan rises, and as the head 208 (see Fig. 23) rides rearwardly it carries with it the lever 218. However, when the pan again lowers carrying the arm 221 downwardly, the latch 219 is moved forwardly to elevate the fork so that the roller 189 will engage under the flange 187 due to the fact that spring means is employed for attracting the sweep 180 over the pan 160. As the latch 219 (see Fig. 25) is following a path diverged from the path of the connector head 208, (also see Fig. 23), the latch will ride past the head 208 and permit the engagement aforesaid, that is, the retention of the fork in an elevated position by the engagement of the roller 189 beneath the flange 187.

The foot pedal 210 obviously serves as a means for operating the fork independently of the pan as when forming windrows when the pan is elevated and out of use. Obviously, in making turns from one direction of travel to the opposite, it is necessary to drop the fork and this is accomplished by actuation of the foot pedal 210.

While the foregoing specification sets forth the invention in specific terms, it is to be understood that numerous changes in the shape, size and materials may be resorted to without departing from the spirit and scope of the invention as claimed hereinafter.

Having thus described my invention what I claim as new is:—

1. In a harvester, a conveyor including a pair of endless elements, one of said elements being longer than the other, protruding at the receiving end of the conveyor beyond the adjacent end of the complementary endless conveyor, said endless elements being provided with tines, and means operating the endless elements so that corresponding tines of the elements will coact in pairs to grip material being conveyed.

2. In a harvester, a conveyor including a pair of endless elements, one of said elements being longer than the other, protruding at the receiving end of the conveyor beyond the adjacent end of the complementary endless conveyor, said endless elements being provided with tines, said tines being swingably mounted, and means for rigidifying the tines when moved to conveying position.

3. In a harvester, a conveyor, said conveyor including a pair of endless elements, one end of one element projecting beyond the adjacent end of the other element, a pair of sub-soil cutters, one of said cutters being in advance of the other and adjacent the receiving end of the shorter element, the other cutter being positioned inwardly of the adjacent longer endless element end and rearwardly of the aforementioned cutter.

4. In a harvester, a conveyor, said conveyor including a pair of endless elements, one end of one element projecting beyond the adjacent end of the other element, a pair of sub-soil cutters, one of said cutters being in advance of the other and adjacent the receiving end of the shorter element, the other cutter being positioned inwardly of the adjacent longer endless element end and rearwardly of the aforementioned cutter, and in interlapping relation therewith.

5. A multiple row harvester comprising a plurality of conveyors arranged in rearwardly converging relation, cutters at the receiving ends of the conveyors, and an automatic dumping receptacle at the discharge end of the conveyors.

6. A multiple row harvester comprising a plurality of conveyors arranged in rearwardly converging relation, cutters at the receiving ends of the conveyors, a receptacle at the discharge end of the conveyors, and a rearwardly tapering apron between the rear ends of the conveyors and the said receptacle.

7. A multiple row harvester comprising a plurality of conveyors arranged in rearwardly converging relation, cutters at the receiving ends of the conveyors, a receptacle at the discharge end of the conveyors, and a rearwardly tapering apron between the rear ends of the conveyors and the said receptacle, said receptacle being tiltable to afford discharging of its contents.

8. A multiple row harvester comprising a plurality of conveyors arranged in rearwardly converging relation, cutters at the receiving ends of the conveyors, a receptacle at the discharge end of the conveyors, and a swingable fork interposed between the conveyors and the receptacle.

9. A multiple row harvester comprising a plurality of conveyors arranged in rearwardly converging relation, cutters at the receiving ends of the conveyors, a receptacle at the discharge end of the conveyors, a rearwardly tapering apron between the rear ends of the conveyors and the said receptacle, and a swingable fork on the reduced end of the apron which when in operated position prevents discharge of material therefrom.

10. A multiple row harvester comprising a plurality of conveyors arranged in rearwardly converging relation, cutters at the receiving ends of the conveyors, a receptacle at the discharge end of the conveyors, a rearwardly tapering apron between the rear ends of the conveyors and the said receptacle, said receptacle being tiltable to afford discharging of its contents, and a swingable fork on the apron for preventing discharge of material from the apron when the receptacle is in tilted position.

11. A multiple row harvester comprising a plurality of conveyors arranged in rearwardly converging relation, cutters at the receiving ends of the conveyors, a receptacle at the discharge end of the conveyors, and means whereby the receptacle is rotated on a substantially horizontal plane.

12. A multiple row harvester comprising a plurality of conveyors arranged in rearwardly converging relation, cutters at the receiving ends of the conveyors, a receptacle at the discharge end of the conveyors, means whereby the receptacle is rotated, tilting means for the receptacle, a swingable material operated sweep mounted over the receptacle, and adapted when operated to stop the rotating means and to operate the tilting means.

13. A multiple row harvester comprising a plurality of conveyors arranged in rearwardly converging relation, cutters at the receiving ends of the conveyors, a receptacle at the discharge end of the conveyors, means whereby the receptacle is rotated, tilting means for the receptacle, a swingable material operated sweep mounted over the receptacle, and adapted when operated to stop the rotating means and to operate the tilting means, a fork for stopping the flow of material into the receptacle and means whereby the fork can be operated independently of the said tilting means.

14. A multiple row harvester comprising a plurality of conveyors arranged in rearwardly converging relation, cutters at the receiving ends of the conveyors, a receptacle at the discharge end of the conveyors means whereby the receptacle is rotated, tilting means for the receptacle, a swingable material operated sweep to stop the rotating means and to operate the tilting means, and means whereby the receptacle can be operated independently of the said tilting means, a fork for stopping the flow of material into the receptacle and means whereby the receptacle can be maintained in tilted position while the fork is being used independently.

15. In combination, a conveyor, and a rotary pan-like receptacle for receiving material at the discharge end of the conveyor to form said material into a ball-like shock.

16. In combination, a conveyor and a rotary pan-like receptacle for receiving material at the discharge end of the conveyor to form said material into a ball-like shock, and means associated with the receptacle for bunching and maintaining the material urged toward the center of the receptacle.

17. A conveyor comprising an endless element made up of a plurality of sections, tines supported by the element, said tines having portions thereof disposed through the section for connecting the said sections.

18. In a bean harvester, bean vine pulling means, and a receptacle for receiving the vines from the pulling means, and means for actuating the receptacle to constrict the vines into a compact mass.

19. In a bean harvester, bean vine pulling means, and a receptacle for receiving the vines from the pulling means, means for actuating the receptacle to constrict the vines into a compact mass, and means for discharging the receptacle.

20. In a bean harvester, bean vine pulling means, a receptacle for receiving the vines from the pulling means, means for actuating the receptacle to constrict the vines into a compact mass, and means for discharging the receptacle, said means being controlled by the bulk of the vines in the receptacle.

21. In a bean harvester, bean vine pulling means, a receptacle for receiving the vines from the pulling means, means for actuating the receptacle to constrict the vines into a compact mass, means for discharging the receptacle, and means for cutting off the supply of vines from the pulling means as the receptacle is being dumped.

HENRY A. MUNGER.